United States Patent [19]

Wittig et al.

[11] Patent Number: 5,014,868
[45] Date of Patent: May 14, 1991

[54] HOLDING DEVICE FOR CONTAINERS

[75] Inventors: Gary P. Wittig, Danville, Ill.; Tom Burpee, Grand Rapids, Mich.

[73] Assignee: CCL Custom Manufacturing, Inc.

[21] Appl. No.: 66,839

[22] Filed: Jun. 25, 1987

Related U.S. Application Data

[63] Continuation of Ser. No. 849,726, Apr. 8, 1986, abandoned.

[51] Int. Cl.⁵ .............................................. B65D 90/12
[52] U.S. Cl. ................................. 220/85 H; 220/529; 220/903; 220/531; 206/306; 215/DIG. 1
[58] Field of Search ................... 220/85 H, 903, 22.3, 220/529, 531; 206/306; 215/DIG. 1

[56] References Cited

U.S. PATENT DOCUMENTS

| | | | |
|---|---|---|---|
| 1,919,811 | 7/1933 | Stonebraker | 215/DIG. 1 |
| 2,142,257 | 1/1939 | Saeta . | |
| 2,458,875 | 1/1949 | Day | 220/22.3 |
| 3,090,478 | 5/1963 | Stanley . | |
| 3,338,390 | 8/1967 | Gordon | 220/306 |
| 3,538,997 | 11/1970 | Christine . | |
| 3,675,759 | 7/1972 | Koppe . | |
| 3,918,920 | 11/1975 | Barber | 220/903 |
| 3,941,237 | 3/1976 | MacGregor | 280/85 H |
| 4,170,316 | 10/1979 | LaBarbera | 220/903 |
| 4,470,180 | 9/1984 | Blomgran | 206/306 |

FOREIGN PATENT DOCUMENTS 892677  2/1962  United Kingdom ............... 220/22.3

Primary Examiner—George E. Lowrance
Attorney, Agent, or Firm—Rodman & Rodman

[57] ABSTRACT

The holding device for containers includes a receptacle member having a capacity which will accommodate a predetermined size range of containers. A selected container is held in the receptacle member by biasing members that are detachably secured to the receptacle member. The biasing members include a flap portion that resiliently bears against the container to detent the container in the receptacle. If a different container is not compatible with the biasing members, a second set of compatible biasing members can be interchanged with the first set. Since the biasing members are detachably secured to the receptacle member, the receptacle member can be formed of a plastic having one Durometer level and the biasing members can be formed of a plastic material having another Durometer level. Each Durometer level is selected to fulfill the optimum desired characteristics of the receptacle and biasing members. The holding device is thus capable of accommodating containers with relatively wide dimensional variations.

20 Claims, 6 Drawing Sheets

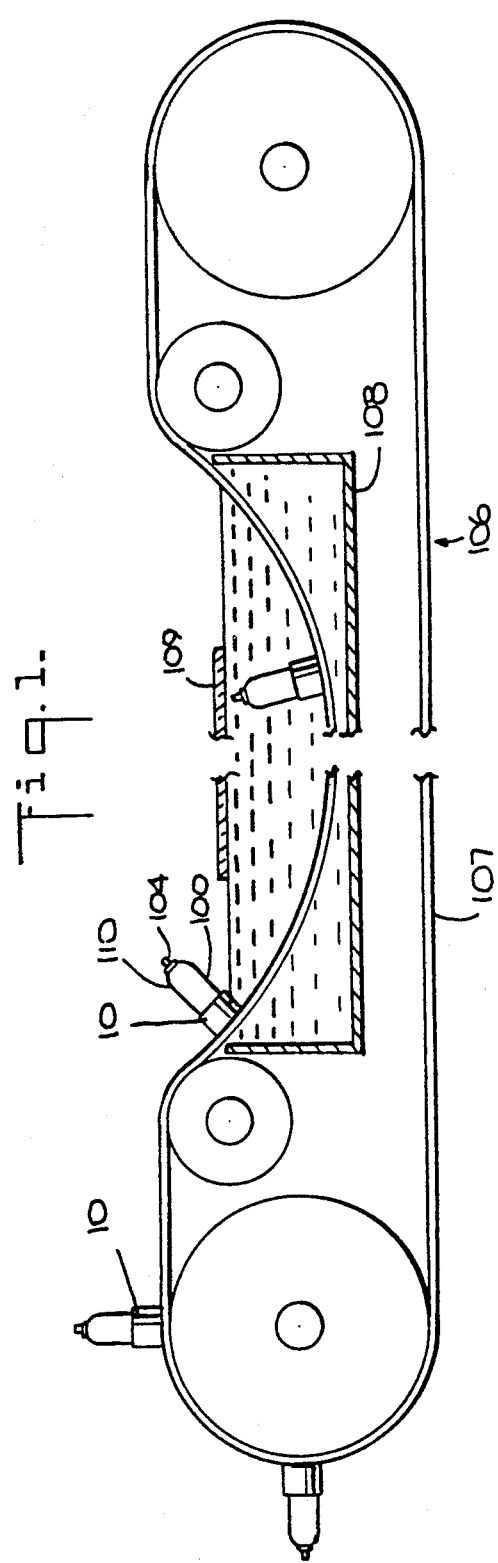
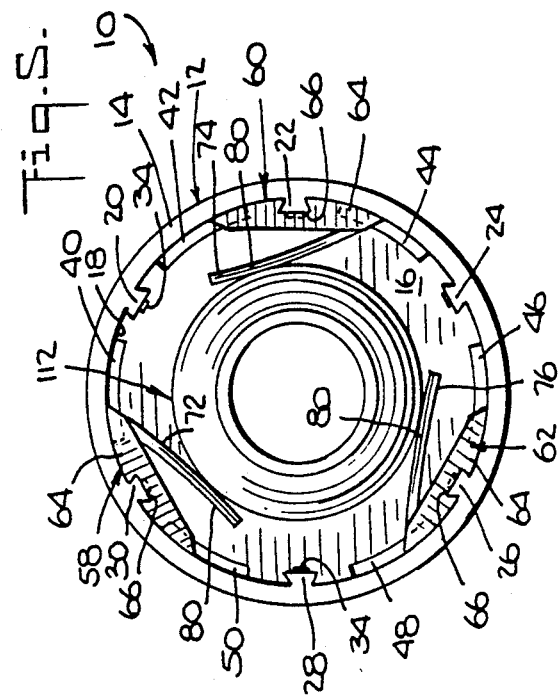

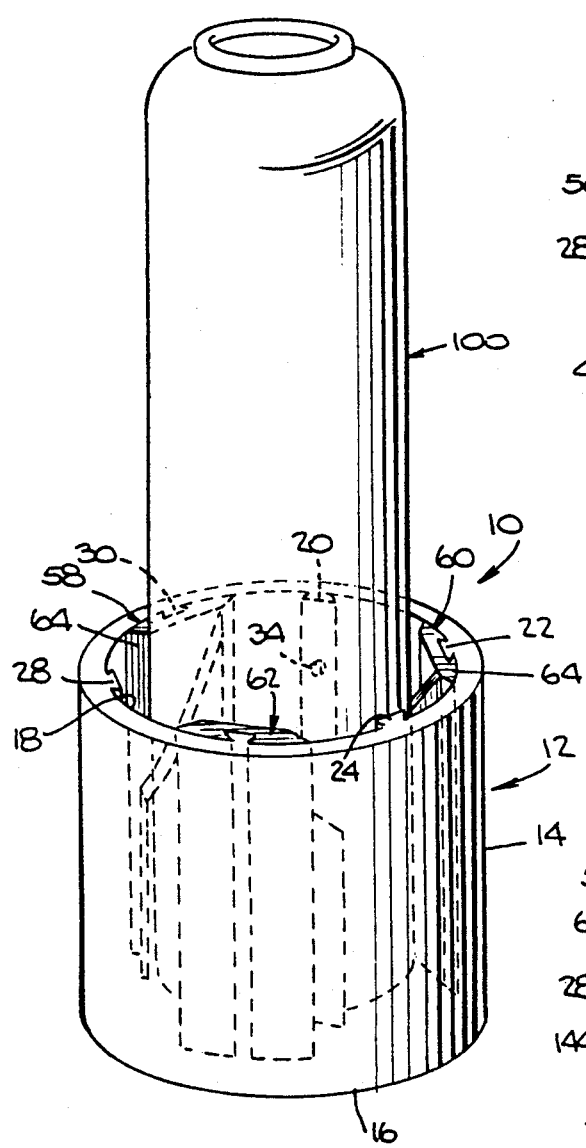
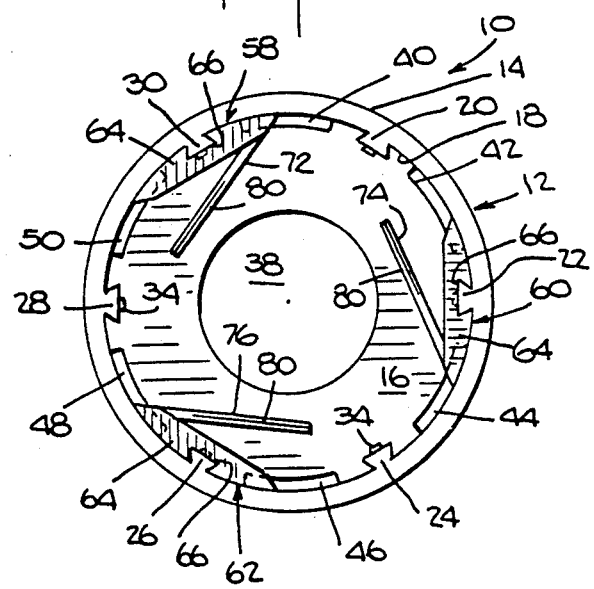
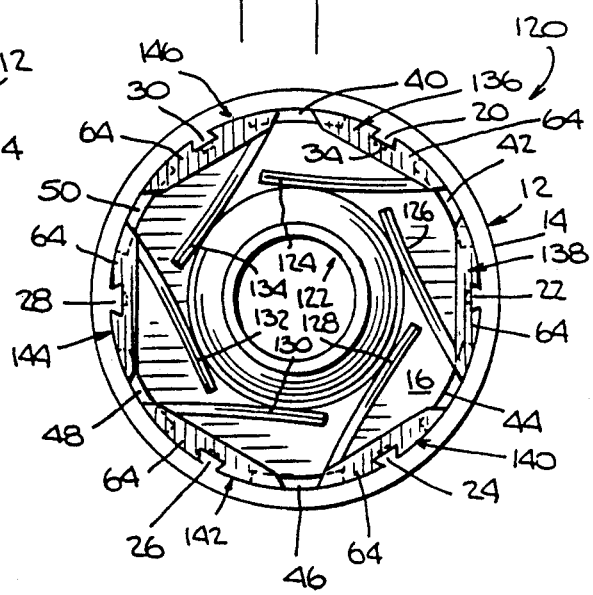

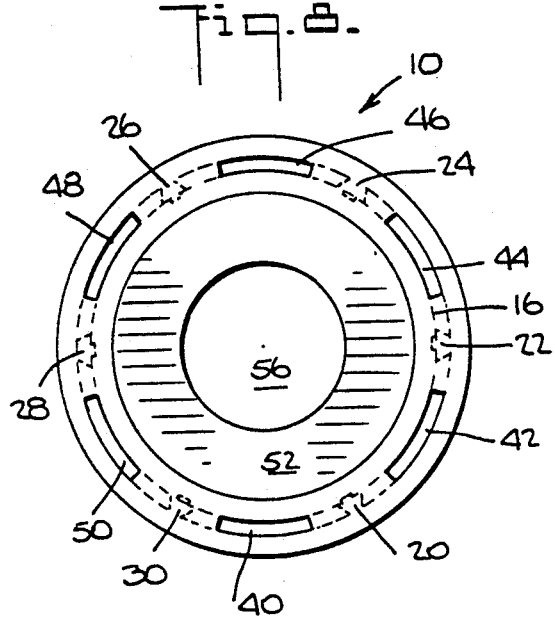
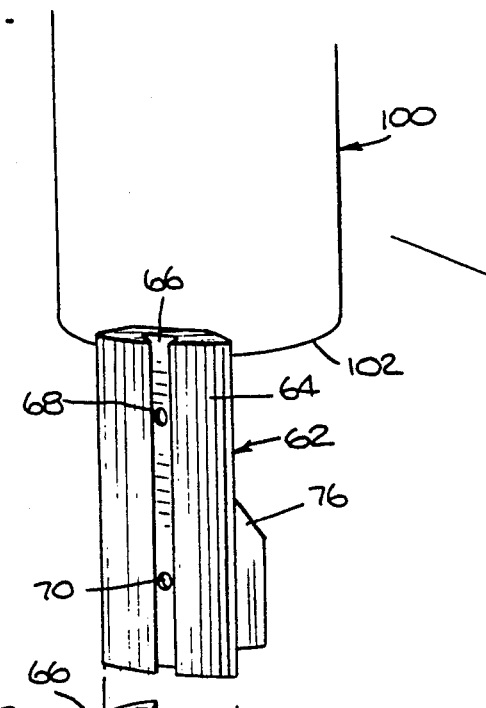
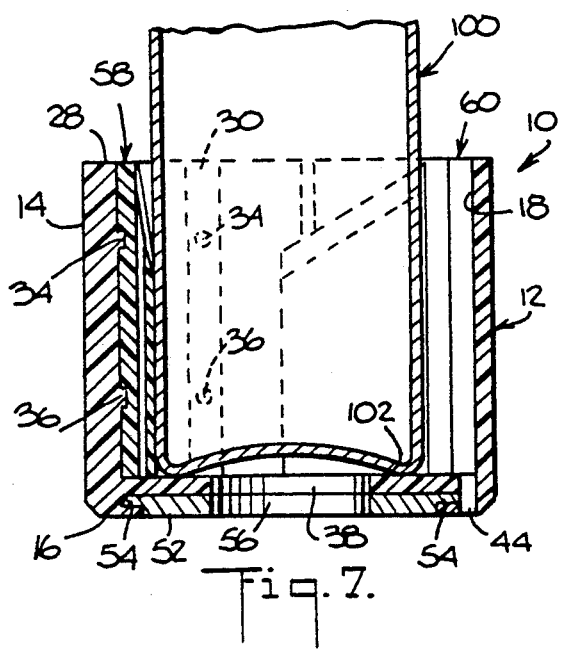
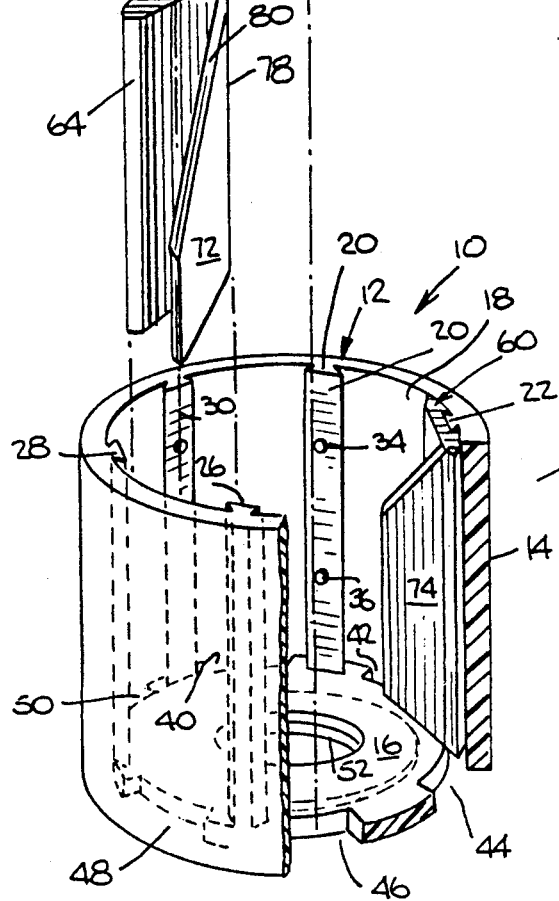
Fig. 5.
Fig. 6.
Fig. 7.

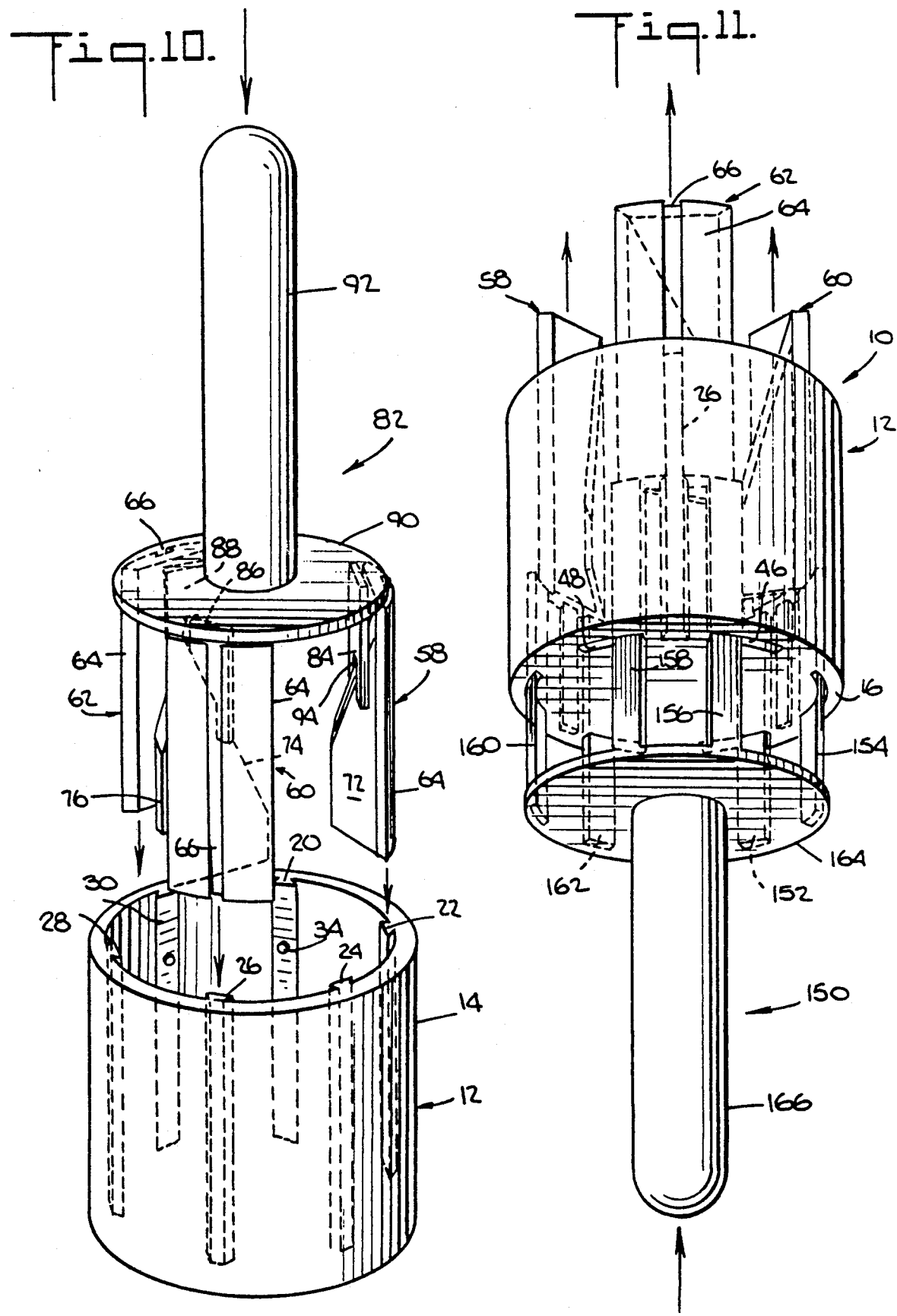

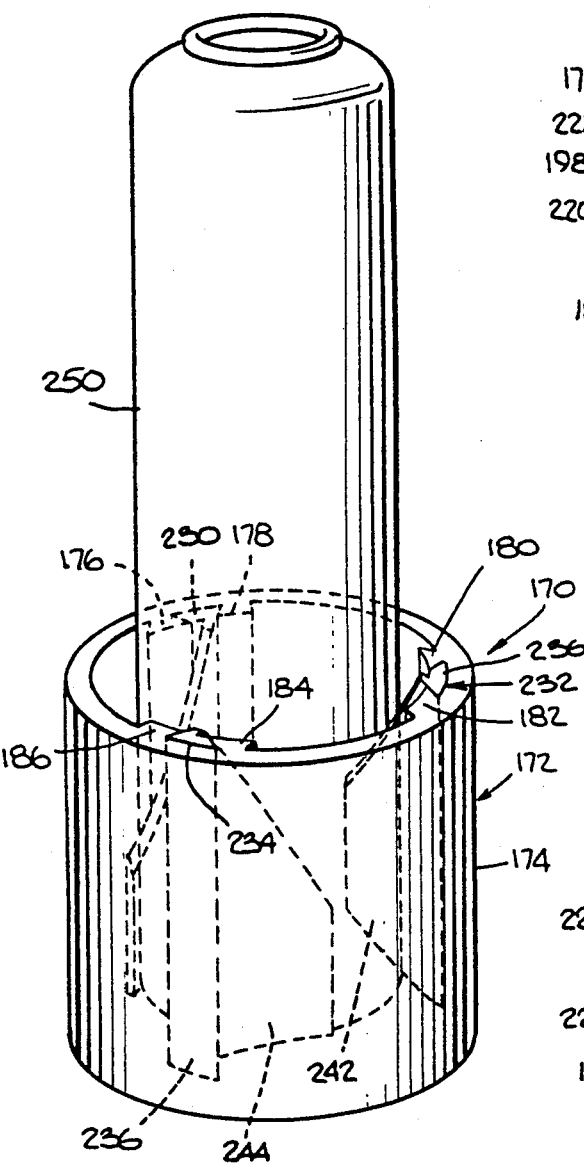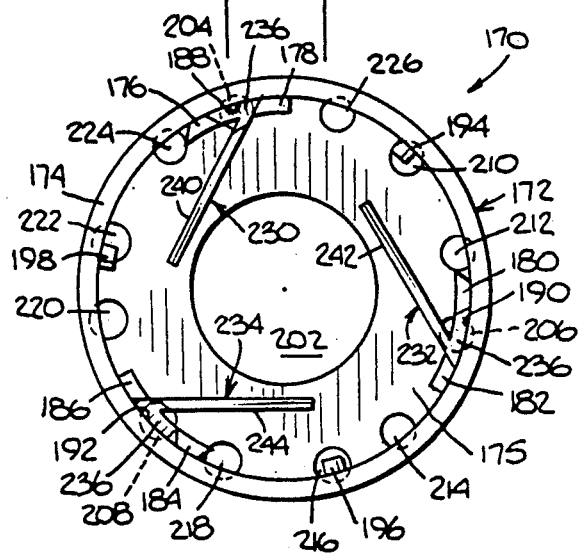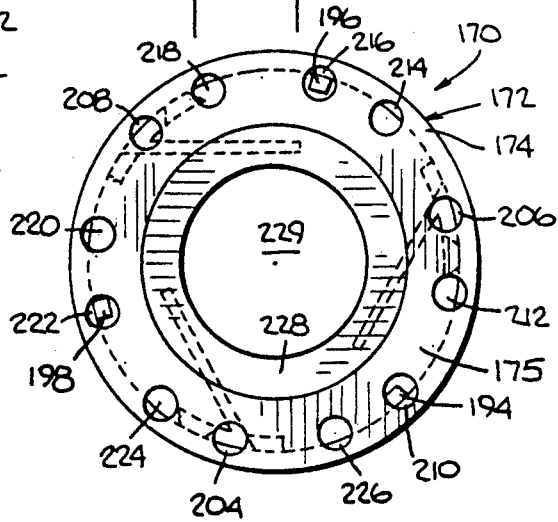

HOLDING DEVICE FOR CONTAINERS

BACKGROUND OF THE INVENTION

This invention relates to holding devices for holding an individual container, while such container is being filled, cleaned or tested for example, and more particularly to a novel holding device and method for accommodating individual containers of different size.

Before a container, such as an aerosol can, is filled and sealed, it is normally subjected to a cleaning process and a pressure or leak test to ensure that the container meets specified requirements for cleanliness, strength and leak resistance. Cleaning, pressure and leak testing are usually accomplished automatically by continuously transporting a succession of containers on a conveyor belt past a series of processing stations.

Since most aerosol containers are formed of non-ferrous materials, a well-known, convenient way of securing each container to a conveyor belt is through the use of a container holding device that releasably grips the container and is magnetically held on the conveyor belt.

One known holding device, disclosed in U.S. Pat. No. 3,941,237, comprises a plastic puck with interior fins integrally molded with the wall of the puck. Engagement of the plastic fins with the periphery of a container that is receivable in the puck releasably holds the container in the puck. A magnetic ring secured to the base of the puck retains the puck on a corresponding magnetic portion of a conveyor belt.

It has been found that the puck of U.S. Pat. No. 3,941,237 has a relatively narrow tolerance with respect to the outside diameter of an aerosol container. It has also been found that the relatively narrow tolerance range of the known puck is due to an integral molding of the shell and the fins to given dimensional levels that are compatible with only a single type of container from a single commercial source.

Since there are various different sources for aluminum containers, the outside diameters from source to source usually vary in the range that extends beyond the tolerance range of the known puck. Thus it may be necessary to allocate different sets of pucks for each different source of aerosol containers to ensure compatibility between the puck and the container.

A desirable match between puck and container does not cause excess interference between the fins and the periphery of the container. Since an empty aluminum aerosol container is easily deformed, excess interference between the puck and the container will damage or mar the container upon insertion into the puck. If interference between the puck and container does not exist or is too slight, the container is likely to float in a water bath that is used during the container cleaning process.

Thus, an inventory of pucks which are compatible with the containers of one manufacturer and incompatible with the containers of another manufacturer may limit a processor to a single source of aluminum containers. The alternative is to maintain enormous puck inventories with slight dimensional variations to accomodate dimensional variations in the containers of different manufacturers.

A processor is thus burdened by enormous space demands and cataloguing requirements in order to maintain puck inventories that respond to the dimensional variations of containers that are characteristic of different manufacturers. The expense of acquiring and organizing puck inventories which assure compatibility with containers furnished by various manufacturers increases product costs and ultimately reduces overall sales and profits. Furthermore, there is considerable disruption of a production line when puck changes are required during a production run to accommodate aluminum containers that are obtained from more than one vendor.

It is thus desirable to provide a holding device for containers that is more forgiving of dimensional variations in containers from different sources than the known puck. It is also desirable to provide a holding device that can be adjusted or modified to accomodate containers of different size.

OBJECTS AND SUMMARY OF THE INVENTION

Among the several objects of the invention may be noted the provision of a novel holding device for containers, a novel holding device that has a wide tolerance for holding containers with dimensional variations that are customary with different container manufacturers, a novel holding device that can be modified to hold containers of different diameter where the differences extend beyond customary dimensional variations, a novel holding device having interchangeable biasing means for gripping containers, a novel holding device for containers wherein a shell component of the holding device is formed of one type of plastic and biasing members of the holding device are formed of another type of plastic, a novel holding device having a selectable number of biasing members, a novel holding device having detachable latchable components for permitting interchange of different biasing members, a novel holding device with interchangeable biasing members for providing different biasing characteristics to hold containers of different size, and a novel holding device which can accommodate any selected number of biasing members.

Other objects and features of the invention will be in part apparent and in part pointed out hereinafter.

In accordance with the present invention, the holding device for releasably gripping a container includes a receptacle means for receiving the container and biasing means in the receptacle means for resiliently bearing against a portion of the container. The receptacle means and the biasing means include detachable securing means for detachable securement of the biasing means to the receptable means. Furthermore, detachment of the biasing means from the receptable means permits interchange of the biasing means in the receptable means with other biasing means.

In one embodiment of the invention, the receptable means includes a cup-shaped receptable member for receiving the container and the biasing means include a plurality of biasing members detachably secured to the receptable to exert a first biasing force on the container.

The biasing members, since they are detachably secured to the receptacle member, can be formed of a material having different characteristics than the receptable member. For example, desirable characteristics of the receptacle member are rigidity and stability of shape. These characteristics are usually associated with a plastic material having a Durometer reading such as 70D Durometer.

Desirable characteristics of the biasing members are flexibility and resiliency. These characteristics are usually associated with a plastic material having a Durometer range of 95A-40D Durometer, for example. Therefore, depending upon the type of container which is being held in the holding device, the biasing members can be of a selected Durometer level that does not necessarily correspond with the durometer level of the plastic which forms the receptacle member.

Since the receptacle member and the biasing members are formed of materials with different Durometer levels, there is no need to compromise with a single Durometer level for both the receptacle and the biasing members, as is the case when these members are molded integrally of the same material.

The holding device of the present invention is thus more forgiving of dimensional variations in a container since the biasing members can be more flexible and resilient than the material which forms the receptacle member.

The biasing members, being detachably secured to the receptacle member, have a securing arrangement that is identical to the securing arrangement of biasing members having different biasing characteristics. Thus, biasing members which are of one size or provide one range of biasing force can be interchanged with different biasing members that are of another size or provide a different range of biasing force.

Interchangeability of insert members also permits one receptacle member of predetermined size to accommodate a substantially wide dimensional range of containers.

For example, a receptacle member and a first set of biasing members that are compatible with a first container may be incompatible with a second container that dimensionally varies beyond a predetermined amount from the first container. The incompatibility problem can be solved by interchanging a second set of biasing members with the first set of biasing members, the second set being selected to assure compatibility with the second container. The same receptacle member can thus be used for both different container sizes.

In one embodiment of the invention the receptacle member will accommodate six biasing members. However, depending upon the total biasing force required, only three biasing members need be used, since all biasing members are detachable from the receptacle member.

In all embodiments of the invention the biasing members include a flap portion and a mounting portion joined to the flap portion such that the flap portion is resiliently pivotable with respect to the mounting portion.

In one embodiment of the invention the securing means includes a slot formed in the mounting portion and a rail formed on the receptable member to engage the slot and thereby hold the biasing member in a predetermined position in the receptacle member.

In another embodiment of the invention the securing means includes a rail formed on the mounting portion and a slot formed at the receptacle member to engage the rail in detachable fashion. In each embodiment detent means are provided for detenting the biasing members in the receptacle member.

Biasing member insert tools and biasing member removal tools are also disclosed to permit ease of installation of the biasing members and corresponding ease of removal of such biasing members from the receptacle member.

The invention accordingly comprises the constructions and method herinafter described, the scope of the invention being indicated in the claims.

DESCRIPTION OF THE DRAWINGS

In the accompanying drawings, in which several embodiments of the invention are illustrated, FIG. 1 is a simplified schematic view of a conveyor system for transporting a plurality of containers to a processing station, the containers being held by holding devices incorporating the present invention;

FIG. 2 is a perspective view of a holding device incorporating one embodiment of the invention, and a container body accommodated in said holding device; the base details of the holding device being omitted for the sake of clarity;

FIG. 3 is a top plan view thereof with the container removed;

FIG. 4 is a top plan view thereof with the container;

FIG. 5 is a top plan view thereof with a container of different size;

FIG. 6 is an exploded perspective view of the combination shown in FIG. 2;

FIG. 7 is a sectional view taken along the line 7—7 of FIG. 4;

FIG. 8 is a bottom view thereof; FIG. 9 is a top plan view of another embodiment of the holding device;

FIG. 10 is an exploded perspective view thereof showing an installation tool for installing the biasing members, the base details of the holding device being omitted for the sake of clarity;

FIG. 11 is an exploded perspective view thereof showing a removal tool for removing the biasing members from the shell of the holding device;

FIG. 12 is a perspective view of another embodiment of the holding device with a container body the base details of the holding device being omitted for the sake of clarity;

FIG. 13 is a top plan view thereof without the container body;

FIG. 14 is a bottom plan view thereof without the container body;

Corresponding reference characters indicate corresponding parts throughout the several views of the drawings.

DETAILED DESCRIPTION OF THE INVENTION

Figure 15:
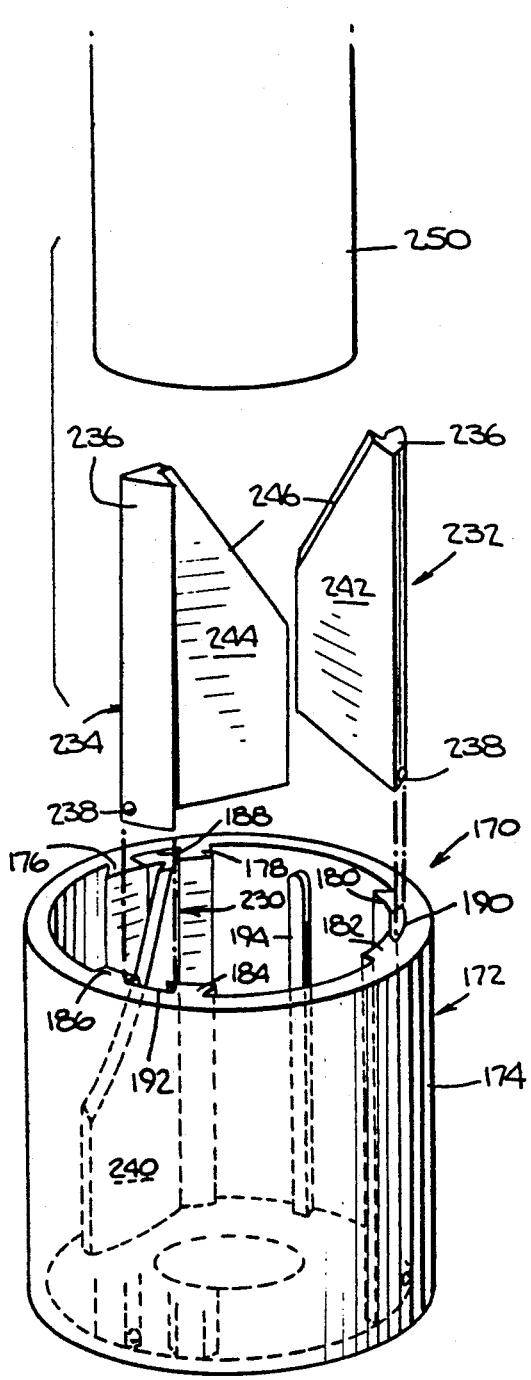
FIG. 15 is an exploded perspective view thereof with the base details being omittd for the sake of clarity.

A holding device incorporating one embodiment of the invention is generally indicated by the reference number 10 in FIG. 1.

Referring to FIGS. 2-8, the holding device 10 comprises a cup-shaped cylindrical receptacle or shell 12, preferably formed of a relatively rigid urethane plastic, of 70D Durometer for example. The shell 12 includes a cyldindrical wall portion 14 and a base portion 16.

The wall 14 has an interior surface 18 formed with a plurality of identical, equally spaced rails 20, 22, 24, 26, 28 and 30, axially oriented in the direction of the cylindrical axis (not shown) of the shell 12. The rails 20-30, which extend substantially the entire axial length of the shell 12, are trapezoidal in cross section and project from the surface 18 toward the axis of the shell 12. A pair of detent stubs 34 and 36, most clearly shown in FIGS. 6 and 7, are formed on each of the rails 20-30.

Referrig to FIG. 3, the base portion 16 includes a central opening 38 and six elongated equally spaced peripheral openings 40, 42, 44, 46, 48 and 50. An annular ring 52 (FIG. 7) is provided at the base portion 16 and is preferably secured in the base 16 during molding of the shell 12.

Securement of the rings 52 in the base 16 is accomplished by forming a reduced peripheral edge portion 54 (FIG. 7) of the ring 52 that is sandwiched inside the base portion 16 during molding of the shell 12. The peripheral edge 54 terminates at or before the peripheral openings 40-50. The ring 52, which is preferably formed of a ferrous metal for magnetic retention purposes, also includes a central opening 56 aligned with an substantially identical in size to the base opening 38.

Referring to FIGS. 2, 3 and 6, for example, biasing means comprising insert members 58, 60 and 62, preferably formed of a suitable resilient plastic, are detachably secured to the shell 12 at the cylindrical wall portion 14. The insert members 58, 60 and 62 can be of 95A-40D Durometer range and each include a mounting portion 64 having a groove or slot 66 of complementary trapezoidal cross-section with the rails 20-30. Each of the slots 66 are formed with detent recesses 68 and 70 (FIG. 6) for respective engagement with the detent stubs 34 and 36 of the rails 20-30.

The insert members 58, 60 and 62 further include respective deflectable flap portions 72, 74 and 76. The flap portions 72, 74 and 76 are hinged or joined at 78 (FIG. 6) to one side of each mounting portion 64, to permit pivotal deflection with respect to each mounting portion 64. The flaps 72, 74 and 76 have an inclined free edge 80 which is also chamfered away from the mounting portion 64.

In assembling the device 10, the insert members 58, 60 and 62 are installed in the shell 12 as shown in FIGS. 3 and 6, by engaging the trapezoidal slots 66 of each insert member 58, 60 and 62 with the rails 22, 26 and 30.

As will be noted from FIG. 3, the flap portions 72, 74 and 76 normally assume a position around the base opening 38 and are approximately 120° apart with respect to the axis or center line (not shown) of the shell 12.

Referring to FIG. 10, installation of the insert members 58, 60 and 62 can be accomplished with an installation tool 82 such as shown in FIG. 10. The tool 82 comprises fork-shaped gripper members 84, 86 and 88 which depend from a support piece 90 affixed to a control shank 92. Each of the gripper members 84, 86 and 88 include a gripper space 94 that accomodates and holds the respective flap portions 72, 74 and 76 in a predetermined orientation to align the insert slots 66 with the rails 22, 26 and 30.

During insert installation, the shell 12 is positioned below the installation tool 82 in a suitable known manner, and the installation tool 82 reciprocates a predetermined distance toward the shell 12. The slots 66 of the mounting portion 64 thus engage the rails 22, 26 and 30 to accomplish installation of the insert members 58, 60 and 62 into the shell 12. Reciprocation of the tool 82 can be accomplished manually or automatically in a suitable known manner.

It should be noted that the detent force provided by the detent stubs 34 and 36 that engage the detent recesses 68 and 70, is sufficient to overcome the holding force of the gripper fingers 84, 86 and 88 on the flaps 72, 74 and 76. Thus a reciprocation of the installation tool 82 away from the shell 12 after the detent stubs 34 and 36 have engaged the detent recesses 68 and 70 will insure that the installation tool 82 is relieved of the insert members 58, 60 and 62.

In using the holding device 10, a container, such as an aerosol container body 100, is installed in the device 10 in the manner shown in FIG. 2. The aerosol container body 100 has a cross sectional diameter that interferes with the flap portions 72, 74 and 76. As the aerosol container body 100 is inserted into the holding device 10 a base portion 102 of the container body 100 engages the inclined free edges 80 of the insert flaps 72, 74 and 76 to cam to pivot the flaps 72, 74 and 76 toward the respective mounting portions 64. Thus the flaps 72, 74 and 76 resiliently yield to entry of the aerosol container body 100 into the holding device 10, while the container body is being fully seated in the holding device 10.

Referring now to FIG. 4, the flaps 72, 74 and 76 engage spaced portions of the peripheral surface of the aerosol container body 100. Due to the resilient nature of the flaps 72, 74 and 76, a biasing or gripping force is provided by the flaps 72, 74 and 76 against the periphery of the aerosol container body 100.

The biasing or gripping force of the device 10 retains the container body 100 in the holding device 10 with a predetermined grip that is determined by the type of material used to form the flaps 72, 74 and 76, the thickness of the flap material, the normal unbiased position or rest angle of the flaps 72, 74 and 76, and the size of the aerosol container body 100.

Since the aerosol container body 100 is generally formed of a thin gauge metal such as aluminum and is easily compressed or deformed, it is necessary that biasing force of the flaps 72, 74 and 76 not exceed the deformation resistance of the aerosol container body. However, the biasing force must be at a sufficient level to maintain the aerosol container body 100 in the holding device 10 during the necessary processing operations that include cleaning, filling, sealing, pressure and leak testing. A capped container 100 provided with a valve assembly 104 is hereinafter referred to as an aerosol 110. Aerosols 110 are transported along a conveyor system such as 106 of FIG. 1 for pressure and leak testing. A continuous series of the holding devices 10 are secured to a conveyor belt 107 of the system 106 by magnetic attraction between the metallic rings 52 and a known magnetically attractive arrangement (not shown) incorporated in the conveyor belt 107.

The conveyor belt 107 transports the holding devices 10 and the aerosols 110 for immersion in a hot water-pressure leak test bath 108 below a safety cover 109 for approximately one and one-half minutes in a water temperature of approximately 165° F. The predetermined gripping force between the holding devices 10 and the aerosols 110 is sufficient to prevent bouyancy forces in the bath 108 from causing the aerosols 110 to float away from the holding devices 10. Following the pressure and leak test, the holding devices 10 and the aerosols 110 are transported to further processing stations for packaging, etc. As shown in FIG. 5, the holding device 10 will also accommodate a container 112 having a smaller diameter than that of the container 100. The size range of containers accommodated by the holding device 10 is based on the holding characteristics of the insert members 58, 60 and 62, the deformation characteristics of the aerosol and the size of the shell 12.

As previously noted, the constituent material of the shell 12 is a relatively rigid plastic, which is desirable to prevent distortion of the shell. However, the constituent material of the insert, since it is not molded with the shell, can be of a different Durometer and of greater flexibility than the shell which enables the holding device 10 to be more "forgiving" of the usual diametrical dimensional variations of the containers 100 and 112.

Under this arrangement the holding device 10 is capable of accommodating a wider size range of aerosols than are accommodated by known holding devices that are molded of a single plastic material, such as disclosed in U.S. Pat. No. 3,941,237.

Another embodiment of the holding device is generally indicated by the reference number 120 in FIG. 9. The holding device 120 accommodates an aerosol container body 122, held by the biasing force of insert flaps 124, 126, 128, 130, 132 and 134 of respective insert members 136, 138, 140, 142, 144 and 146.

The insert members 136-146 include respective mounting portions 64 having trapezoidal slots 66 that engage the respective rails 20, 22, 24, 26, 28 and 30 of the shell 12. Thus the holding device 120 has three more insert members than the holding device 10, to provide additional gripping force as needed.

The flaps 124-134 can be a different Durometer than the flaps 72, 74 and 76 of the holding device 10 depending on the desired predetermined gripping force. The holding device 120 and the holding device 10 each include identical shell members 12.

Although the holding device 120 includes insert members that may be of a different Durometer than the insert members of the holding device 10, it will be apparent that the insert members of the holding device 10 are interchangeable with the insert members of the holding device 120 and vice versa. The insert members 136-146 of the holding device 120 can be design characteristics that differ from that of the insert members 72, 74 and 76 of the holding device 10.

For example, the insert members 134-136 can be molded such that the at-rest angle between the flap and the mounting portion is greater or less than that of the insert members 58, 60 and 62 for purposes of establishing a different predetermined biasing force. Color coding can be used to identify the particular characteristics of different insert members by, for example, using plastic material of different color to form the different insert members.

The holding device 120 is used in the same manner as the holding device 10.

Referring to FIG. 11, the holding device 10 can be converted to the holding device 120 by use of an insert removal tool 150.

The insert removal tool 150 has lifter elements 152, 154, 156, 158, 160 and 162 projecting from a support piece 164 affixed to a control shank 166. The removal tool 150 can be adapted to operate with known automatic reciprocating devices or, if desired, can be used manually.

Insert removal is accomplished by aligning the lifter elements 152-162 with the peripheral base openings 40-50 (FIG. 8) of the shell 12 such that the mounting portions 64 of the insert members 58, 60 and 62 are engaged by the lifter elements 152-162. As shown in FIG. 11, movement of the lifter elements 152-162 against the mounting portions 64 with a force that overcomes the detent holding force provided by the detents 34, 36, 68 and 70 will cause the insert members 58, 60 and 62 to slide along the rails 22, 26 and 30 outwardly of the shell 12.

After the insert members 58, 60 and 62 have been removed from the shell 12, an installation tool (not shown) similar to the installation tool 82 but having six equally spaced gripper members, such as 84, 86 and 88, can be used to install the insert members 136-146 in the shell 12 to provide the holding device 120.

Removal or installation of six insert members from the holding device 120 can also be accomplished by removal and installation tools (not shown) similar to the tools 150 and 82, but having lifter elements and gripper members that correspond to each of the six insert members.

If desired, another option for insert installation is to use the installation tool 82 to first install the three insert members 136, 140 and 144 on the rails 20, 24 and 28, and then use the tool 82 to install the three insert members 138, 142 and 146 on the rails 22, 26 and 30, thereby providing the holding device 120.

A further embodiment of the holding device is generally indicated by the reference number 170 in FIGS. 12-14. The holding device 170 comprises a cup-shaped cylindrical receptacle or shell 172 formed of the same type of material as the shell 12 of the holding device 10. The shell 172 includes a cylindrical wall portion 174 and a base portion 175.

The wall portion 174 is formed with elongated channel defining bosses 176,178; 180,182; and 184,186. The channel defining bosses 176-178, 180-182, and 184-186 define respective trapezoidal-shaped channels 188, 190 and 192 spaced approximately 120° apart. Reinforcing bosses 194, 196 and 198 are also formed on the wall portion 174. The bosses 194, 196 and 198 help minimize any distortion of the shell 172. Each of the trapezoidal shaped channels 188, 190 and 192 includes a detent recess 200 (FIG. 17) near the base portion 175.

Referring to FIG. 13, the base portion 175 includes a central opening 202 and a plurality of peripheral drainage openings such as 204, 206 and 208 that extend through the base 175 in alignment with the trapezoidal channels 188, 190 and 192. Additional peripheral drain openings such as 210, 212, 214, 216, 218, 220, 222, 224 and 226 can also be provided in the base portion 175.

An annular ring 228 (FIGS. 14 and 17) similar to the ring 52, of the holding device 10 is provided in the base portion 175 in a manner similiar to that described for the holding device 10. A central opening 229 of the ring 228 aligns with and is coextensive with the central opening 202 of the base 175.

Biasing means comprising insert members 230, 232 and 234, formed of a resilient plastic material similar to that described for the insert members 58, 60 and 62, are detachably secured to the shell 172 at the wall 174. The insert members 230, 232 and 234 each include a mounting portion 236 that is of complementary trapezoidal cross-section with the trapezoidal-shaped channels 188, 190 and 192. Each of the mounting portions 236 is formed with a detent stub 238 (FIGS. 15 and 17) for respective engagement with the detent recesses 200.

The insert members 230, 232 and 234 include respective deflectable flap portions 240, 242 and 244 that are joined to the mounting portions 236 in a manner which permits pivotal deflection of the flaps 240, 242 and 244 with respect to the mounting portions 236. The flaps 240, 242 and 244 have an inclined free edge 246 (FIG. 15) which is also chamfered away from the mounting portions 236.

The holding device 170 is used in a manner similar to that previously described for the holding device 10. If desired, the reinforcing bosses 194, 196 and 198 on the wall 174 can be replaced by channel defining bosses to accommodate additional insert members similar to the insert members 230, 232 and 234.

The holding device 170 will accommodate a predetermined size range of containers such as 250 based on the characteristics of the insert members 230, 232, 234. If it is desired to accommodate containers of different size outside the compatibility range of the insert members 230, 232 and 234, an insert member interchange is easily accomplished to provide the desired compatibility with the containers of different size.

Since the insert members 230, 232 and 234 have a different Durometer than the material comprising the shell 172, the flap members 240, 242 and 244 are more forgiving of dimensional variations in container size than would be a holding device entirely molded of one material with one Durometer.

Figure 16:
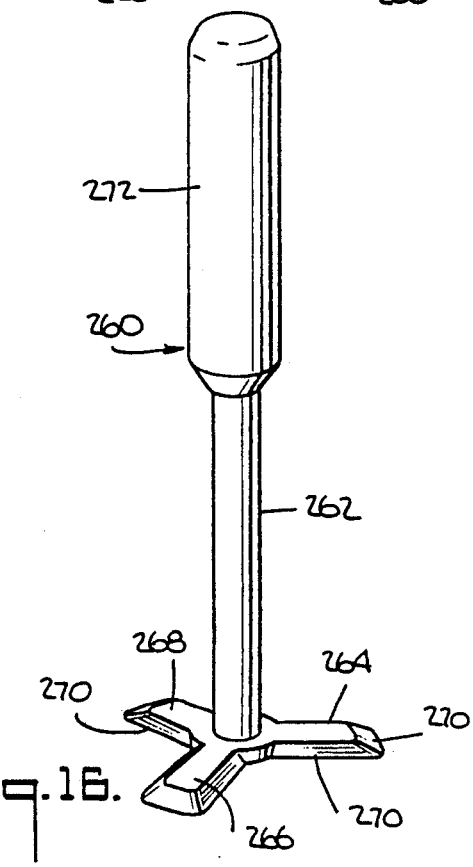
FIG. 16 is a perspective view of a removal tool.

It will be apparent that insert installation and removal tools of the type previously described can be adapted to install and remove the insert members 230, 232 and 234. However, insert removal can also be accomplished with the removal tool 260 shown in FIGS. 16 and 17.

The insert removal tool 260 includes a stem portion 262, one end of which has radially extending lifter fingers 264, 266 and 268. Each of the lifter fingers 264, 266 and 268 have tapered peripheral edge portions 270. A handle 272 is provided at the opposite end of the stem portion.

Figure 17:
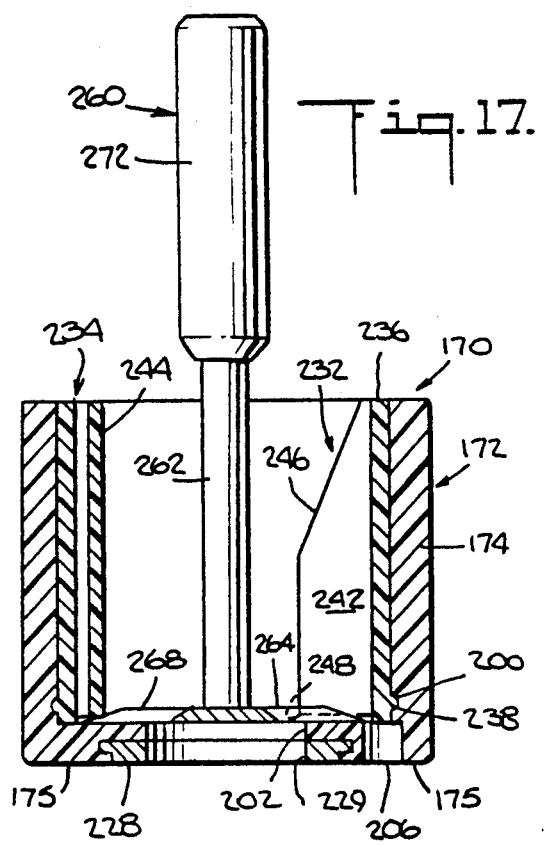
FIG. 17 is a side view of the holding device partly shown in section including the removal tool positioned for removing the biasing members.

In using the removal tool 260, the lifter fingers 264, 266 and 268 are bottomed against the base 175 as shown in FIG. 17, such that the lifter fingers 264, 266 and 268 are intermediate the flap portions 240, 242 and 244. The handle 272 is rotated clockwise with respect to FIG. 17, to cause the tapered edge portions 270 to cam the lifter fingers 264, 266 and 268 between the base 175 and the respective flap portions 240, 242 and 244.

The lifter fingers 264, 266 and 268 thus urge the insert members 230, 232 and 234 to slide away from the base 175, disengaging the detent stubs 238 from the detent recess 200.

The handle 272 can be reciprocated and rotated manually or automatically relative to the holding device 170 in a suitable known manner to extricate the insert members 230, 232 and 234 from their respective trapezoidal channels 188, 190 and 192.

If desired a slight clearance 248 (FIG. 17) can be provided between the flaps 240, 242 and 244 and the base 175 to facilitate entry of the lifter fingers 264, 266 and 268 between the flaps 240, 242 and 244, and the base 175. The flaps 240, 242 and 244 can be foreshortened a predetermined amount to provide the clearance 248.

Interchangeable inserts (not shown) to replace the removed inserts 230, 232 and 234 can be installed with an installation tool similar to the tool 82.

Some advantages of the present invention evident from the foregoing description include a holding device which will accommodate a relatively wide range of dimensional variation in containers, a holding device which is formed of two different materials each selected for optimum function. For example, a relatively rigid material is required for the shell of the holding device to prevent distortion and a relatively flexible material is required for the flap members of the insert to allow for a wide range of dimensional variation of the container.

Thus a single holding device of the type disclosed herein will perform a holding function for a wide range of container size.

A further advantage is that the insert members are interchangeable with other insert members having the same or different biasing characteristics. Thus a uniform or single shell can accommodate interchangeable insert members having different biasing characteristics thereby rendering the holding device compatible with an extremely wide range of dimensional variations in container size.

In view of the above, it will be seen that the several objects of the invention are achieved and other advantageous results attained.

As various changes can be made in the above constructions and method without departing from the scope of the invention, it is intended that all matter contained in the above description or shown in the accompanying drawings shall be interpreted as illustrative and not in a limiting sense.

What is claimed is:

1. A holding device for releasably gripping a container comprising, receptacle means for receiving said container, biasing means detachably secured in said receptacle means for resiliently bearing against predetermined portions of said container, said biasing means, upon detachment from said receptacle means, being interchangeable in said receptacle means with other said biasing means, said receptacle means being formed of a first plastic material at a first durometer level characterized by relative rigidity and stability and said biasing means being formed of a second plastic material at a second durometer level, different from said first durometer level, characterized by relative resilience and flexibility.

2. The holding device as claimed in claim 1, wherein said receptacle is cup-shaped, having a base end and an open end opposite said base end, and said biasing means include first elongated biasing members extending substantially from said base end towards said open end.

3. The holding device as claimed in claim 2, including a first predetermined number of said first elongated biasing members for providing a first biasing force against said container.

4. The holding device as claimed in claim 3, including a second predetermined number of said first elongated biasing members for providing a second biasing force against said container.

5. The holding device as claimed in claim 2, including second elongated biasing members that differ in resilience and flexibility from said first elongated biasing members, said second elongated biasing members being interchangeable with said first elongated biasing members.

6. The holding device as claimed in claim 5, including selected predetermined numbers of said first and second elongated biasing members detachably secured in said receptacle means.

7. The holding device as claimed in claim 5, wherein said receptacle has an elongated longitudinal axis and said first elongated biasing members have a first radially inward extent in said receptacle means with respect to said longitudinal axis and said second elongated biasing members have a second radially inward extent in said receptacle means with respect to said longitudinal axis.

8. The holding device as claimed in claim 1, wherein said receptacle means and said biasing means include detachable securing means for detachable securement of said biasing means to said receptacle means.

9. The holding device as claimed in claim 8, wherein said detachable securing means include first and second detachable latchable components.

10. The holding device as claimed in claim 9, wherein one of said detachable latchable components includes a slot and the other of said detachable latchable components includes a rail engageable in said slot.

11. The holding device as claimed in claim 10, wherein said rail is formed on said receptacle means and said slot is formed in said biasing means.

12. The holding device as claimed in claim 10, wherein said rail is formed on said biasing means and said slot is formed at said receptacle means.

13. The holding device as claimed in claim 1, wherein said biasing means comprise a biasing member having a flap portion, a mounting portion joined to said flap portion such that said flap portion is resiliently pivotable with respect to said mounting portion, said flap portion being sized to exert a predetermined biasing force on said container when said container of predetermined size is installed in said receptacle means.

14. The holding device as claimed in claim 13, wherein said receptacle means and said biasing means include detachable securing means for detachable securement of said biasing means to said receptacle means, said securing means including a rail formed on said mounting portion, and a slot formed on said receptacle means to engage said rail to hold said biasing member in a predetermined position in said receptacle means.

15. The holding device as claimed in claim 13, wherein said detachable securing means includes a slot formed in said mounting portion and a rail formed on said receptacle means to engage said slot to hold said biasing member in a predetermined position in said receptacle means.

16. The holding device as claimed in claim 1, including detent means on said biasing means and said receptacle means for detenting said biasing means in said receptacle means.

17. A holding device for releasably gripping a container comprising a cup-shaped receptacle member for receiving said container, biasing means in said receptacle member, said biasing means including a first biasing member having a flap portion for exerting a first biasing force on said container, said receptacle member and said biasing member including detachable securing means for permitting detachment of said first said biasing member from said receptacle member for interchange with another said first biasing member.

18. The holding device as claimed in claim 17, wherein said biasing means includes a second biasing member interchangeable with said first biasing member, said second biasing member exerting a second biasing force on said container different from said first biasing force.

19. A method of releasably gripping containers in a holding device comprising,
(a) forming a container accommodating receptacle of the holding device, of one plastic material which has a first durometer level characteristic of rigidity and stability,
(b) forming a plurality of biasing means for detenting the container in the receptacle of a second plastic material which has a second durometer level characteristic of resilience and flexibility, and
(c) detachably securing the biasing means in the receptacle to permit interchange with other biasing means such that the biasing means selected assure compatibility of the holding device with the container being gripped.

20. The method of claim 19, including employing any selected plurality of biasing means in said receptacle.

* * * * *

UNITED STATES PATENT AND TRADEMARK OFFICE
CERTIFICATE OF CORRECTION

PATENT NO. : 5,014,868

DATED : May 14, 1991

INVENTOR(S) : Wittig et al

It is certified that error appears in the above-identified patent and that said Letters Patent is hereby corrected as shown below:

At column 4, line 44, change "omittd"
    to -- omitted --.

At column 5, line 4, change "referrig"
    to -- referring --.

At column 8, line 7, after "can" insert -- then --.

At column 12, line 8, after "member" insert -- for resiliently bearing against a portion of said container to detent said container in said receptacle member, --.

Signed and Sealed this

Tenth Day of November, 1992

Attest:

DOUGLAS B. COMER

*Attesting Officer*    *Acting Commissioner of Patents and Trademarks*